US005296279A

United States Patent [19]

Birnbaum et al.

[11] Patent Number: 5,296,279

[45] Date of Patent: Mar. 22, 1994

[54] SELF ADHESIVE POSTAGE STAMP CONSTRUCTION

[75] Inventors: Robert P. Birnbaum, Redlands, Calif.; Alan Green, Simpsonville, S.C.; Joseph Y. Peng; Alim A. Fatah, both of Washington, D.C.

[73] Assignee: Avery Dennison Corporation, Pasadena, Calif.

[21] Appl. No.: 904,370

[22] Filed: Jun. 25, 1992

[51] Int. Cl.[5] .......... C09J 7/02

[52] U.S. Cl. .......... 428/42; 428/50; 428/56; 428/343; 283/71

[58] Field of Search .......... 428/33, 42, 55, 56, 428/50; 283/71

[56] References Cited

U.S. PATENT DOCUMENTS 4,876,131 10/1989 Ashby .......... 428/42
4,895,747 1/1990 Birkholz .......... 428/42
4,952,433 8/1990 Tezuka .......... 428/42

*Primary Examiner*—Jenna L. Davis
*Attorney, Agent, or Firm*—Christie, Parker & Hale

[57] ABSTRACT

There is provided herewith a postage stamp construction of currency size in which a first array of individually removable postage stamps are separated from the second array of individually removable postage stamps by a transverse peel strip.

2 Claims, 1 Drawing Sheet

SELF ADHESIVE POSTAGE STAMP CONSTRUCTION

FIELD OF THE INVENTION

Invention is directed to an arrangement of postage stamps in a currency size laminate.

BACKGROUND OF THE INVENTION

Various postal services have determined that it would be convenient to serve users of postage stamps with means to purchase the postage stamps through automatic teller machines.

Such automatic teller machines are designed to handle currency of a certain size and thickness. It is also desirable in postage stamp construction to provide identification codes to identify stamp by lot number or other information.

It is to the configuration of postage stamps on and as part of a laminate of currency size configuration that is the subject matter of the instant invention.

SUMMARY OF THE INVENTION

The present invention pertains to a laminate of a first array of postage stamps, preferably nine separated from a second array of postage stamps, also preferably nine by a peel strip extending across the width of the two arrays.

The preferred construction is rectangular with an equal number of a plurality of rectangular postage stamps on each side of a peel strip which extends the width of the rectangle.

The postage stamps are adhered to a release liner through a pressure sensitive adhesive.

THE DRAWINGS

DETAILED DESCRIPTION OF THE INVENTION

Figure 2:
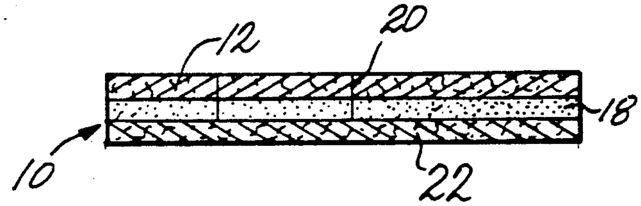
FIG. 2 is an exaggerated view of the side view of the cross section of FIG. 1 taken at 2—2, illustrating the minimum elements of the construction.
Figure 1:
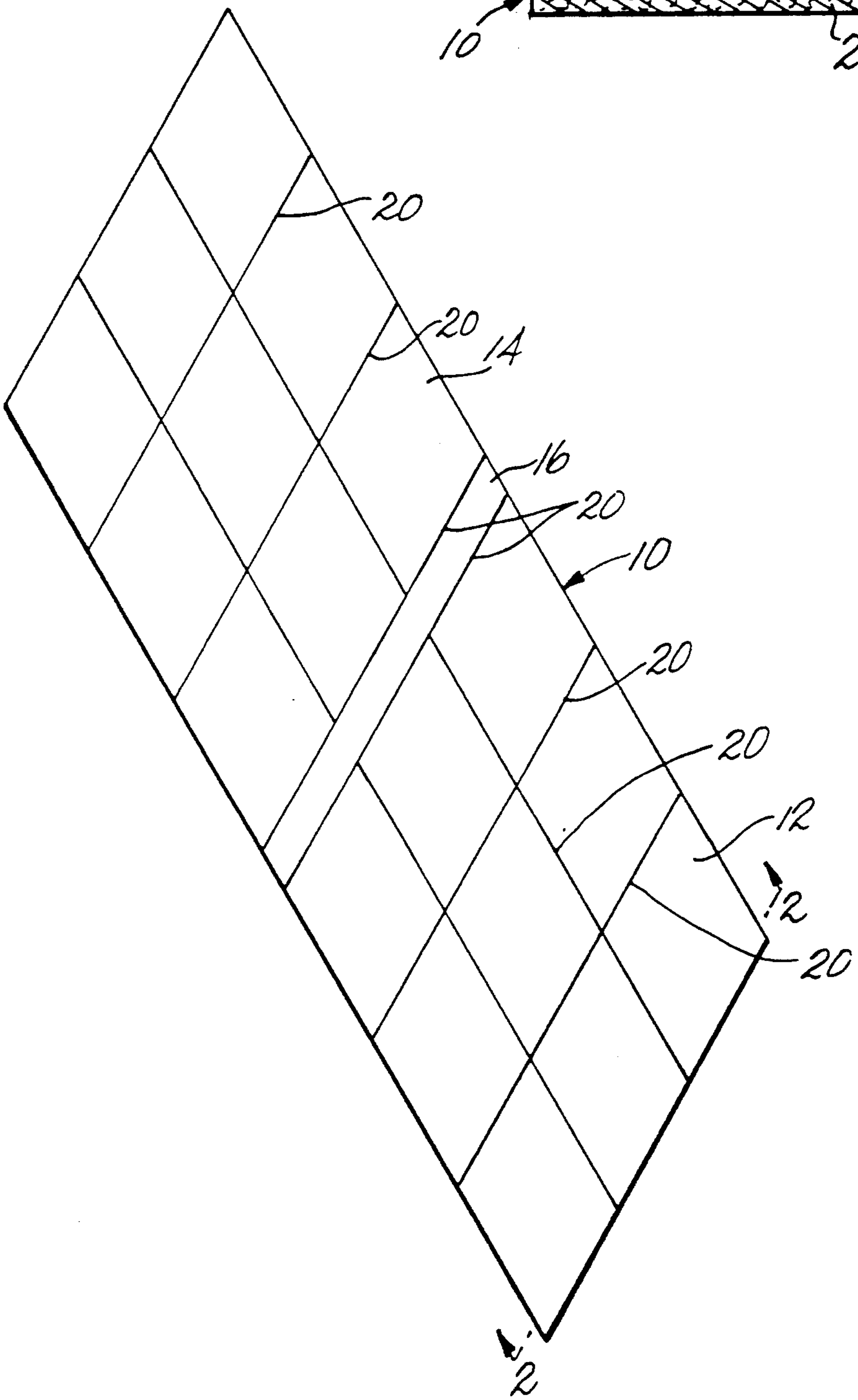
FIG. 1 is a prospective view of the postage stamp construction of the instant invention.

With reference now to FIGS. 1 and 2 the postage stamp construction 10 of the instant invention consists of an array of first postage stamps 12 separated from a second array of postage stamps 14 by a medial strip 16. Stamps 12, 14 and strip 16 are adhered directly or indirectly to a pressure sensitive adhesive layer 18 both are formed by die-cuts 20 to the face of release liner 22.

The laminate may be constructed of any materials which in final assembly will have a configuration of currency and of a final thickness which is compatible with the operating parameters of an automatic teller machine.

In the construction, strip or bar 16 is employed as a means to add identification information by a postal service to the currency size array of postage stamps and also to provide a removable strip which leaves the two arrays of postage stamps 12 and 14 allowing for ease of stamp removal and for the construction to be folded in half for insertion in wallets and other currency carriers.

The materials used for the backing or facestock of postage stamp construction may be any desirable material including self supporting polymeric films such as polyester, cellulosic material such as paper and the like. They may be coated and uncoated. The only requirement is that the surface be cancelable.

The pressure sensitive adhesive may be of any conventional pressure sensitive adhesive which resists edge-ooze such as elastomeric, acrylic and like pressure sensitive adhesives formed by solvent, emulsion or bulk polymerization. The adhesive may be cast onto any layer forming the construction by solvent coating, emulsion coating and hot melt coating.

As is typical in any laminate construction the adhesive may be cast onto the release liner 22 which is normally a siliconized paper and laminated to a backing or facestock which is normally then die-cut to the release liner providing longitudinal and transverse cuts forming stamps 20 and 14 separated by the removable strip 16.

In the preferred construction each array consists of nine stamps with three stamp of each array being contiguous to the removable strip.

There may be employed in the constructions top coats, bottom coats, tie coats and the like to achieve desired dispensing and use performance characteristics.

What is claimed is:

1. An arrangement of postage stamps which comprise a first array of nine individually removable postage stamps separated from a second array of nine individually removable postage stamps by a continuous peel strip, the combined first and second arrays of postage stamps and peel strip being of currency size, said arrays of said postage stamps and peel strip being adhered through a pressure sensitive adhesive to a release liner and formed by die cutting through a cancelable backing provided with postage information for each individual postage stamp printed thereon and a pressure sensitive adhesive layer to said release liner forming thereby said first array of postage stamps separated from a second array of postage stamps b a continuous peel strip extending across the width of the first and second arrays of postage stamps.

2. A construction as claimed in claim 1 in which the construction is rectangular having a length and width with three stamps of the first array of nine rectangular postage stamps on one side of the peel strip and three stamps of the second array of nine rectangular postage stamps on the opposite side of the peel strip each contiguous to the peel strip.

* * * * *

UNITED STATES PATENT AND TRADEMARK OFFICE

CERTIFICATE OF CORRECTION

PATENT NO. : 5,296,279

DATED : March 22, 1994

INVENTOR(S) : Robert P. Birnbaum; Alan Green; Joseph Y. Peng; Alim A. Fatah

It is certified that error appears in the above-indentified patent and that said Letters Patent is hereby corrected as shown below:

Column 1, line 7, change "Invention is directed" to -- The invention is directed --.

Column 1, 51, after "both" insert -- which --.

Column 2, line 28, change "three stamp" to -- three stamps --.

Column 2, line 47, after "stamps" change "b" to -- by --.

Signed and Sealed this

Seventh Day of November, 1995

Attest:

Bruce Lehman

BRUCE LEHMAN

Attesting Officer

Commissioner of Patents and Trademarks